United States Patent
Reynard et al.

(10) Patent No.: US 12,056,836 B2
(45) Date of Patent: Aug. 6, 2024

(54) DENTAL MODEL SUPERIMPOSITION USING CLINICAL INDICATIONS

(71) Applicant: Nobel Biocare Services AG, Kloten (CH)

(72) Inventors: Delphine Reynard, Montreuil (FR); Pascal Narcisse, Marne la Vallee (FR); Xavier Ripoche, Marne la Vallee (FR); Jean-Pascal Jacob, Marne la Vallee (FR); Sabrina Capron-Richard, Noisiel (FR)

(73) Assignee: Nobel Biocare Services AG, Kloten (CH)

( * ) Notice: Subject to any disclaimer, the term of this patent is extended or adjusted under 35 U.S.C. 154(b) by 148 days.

(21) Appl. No.: 17/418,641

(22) PCT Filed: Dec. 27, 2019

(86) PCT No.: PCT/EP2019/087087
§ 371 (c)(1),
(2) Date: Jun. 25, 2021

(87) PCT Pub. No.: WO2020/136247
PCT Pub. Date: Jul. 2, 2020

(65) Prior Publication Data
US 2022/0101618 A1   Mar. 31, 2022

(30) Foreign Application Priority Data
Dec. 28, 2018   (EP) .................................... 18306867

(51) Int. Cl.
*G06T 15/00*   (2011.01)
*A61C 7/00*   (2006.01)
(Continued)

(52) U.S. Cl.
CPC .............. *G06T 19/20* (2013.01); *A61C 7/002* (2013.01); *A61C 9/004* (2013.01); *G06T 7/0012* (2013.01);
(Continued)

(58) Field of Classification Search
USPC ........................................................ 345/418
See application file for complete search history.

(56) References Cited

U.S. PATENT DOCUMENTS 5,270,926 A   12/1993   Tam
5,999,587 A   12/1999   Ning et al.
(Continued)

OTHER PUBLICATIONS

Larson BE, Vaubel CJ, Grünheid T. Effectiveness of computer-assisted orthodontic treatment technology to achieve predicted outcomes. The Angle Orthodontist. Jul. 1, 2013;83(4):557-62.*
(Continued)

*Primary Examiner* — Phu K Nguyen
(74) *Attorney, Agent, or Firm* — Alston & Bird LLP

(57) ABSTRACT

A method for displaying a superimposition of a second dental model on a first dental model of a patient's dentition, obtains a first 3D model of the patient's dentition and a segmentation of the first 3D model. A second 3D model of the patient's dentition and a segmentation of the second 3D model are obtained. A selected tooth is identified from the segmented teeth of the first and second 3D models. A post-treatment target position for the selected tooth of the first 3D model is determined according to a movement indication calculated for the selected tooth. The second 3D model is registered to the first 3D model based on the target position of the at least one selected tooth. An imposition of the second 3D model onto the first 3D model of the patient dentition is displayed.

19 Claims, 13 Drawing Sheets

(51) Int. Cl.
  *A61C 9/00* (2006.01)
  *G06T 7/00* (2017.01)
  *G06T 7/10* (2017.01)
  *G06T 7/30* (2017.01)
  *G06T 17/20* (2006.01)
  *G06T 19/20* (2011.01)

(52) U.S. Cl.
  CPC .................. *G06T 7/10* (2017.01); *G06T 7/30* (2017.01); *G06T 17/20* (2013.01); *G06T 2207/10081* (2013.01); *G06T 2207/30036* (2013.01); *G06T 2219/2016* (2013.01)

(56) References Cited

U.S. PATENT DOCUMENTS

| | | | |
|---|---|---|---|
| 8,670,521 | B2 | 3/2014 | Bothorel et al. |
| 10,813,720 | B2* | 10/2020 | Grove .................. A61C 9/0093 |
| 11,564,774 | B2* | 1/2023 | Salah .................. A61B 5/0088 |
| 11,707,180 | B2* | 7/2023 | Falkel .............. A61B 1/000094 382/128 |
| 2003/0039389 | A1 | 2/2003 | Jones et al. |
| 2005/0048432 | A1 | 3/2005 | Choi et al. |
| 2011/0270583 | A1 | 11/2011 | Getto et al. |
| 2013/0120532 | A1 | 5/2013 | Milch |
| 2013/0120533 | A1 | 5/2013 | Milch |
| 2014/0329194 | A1* | 11/2014 | Sachdeva ............... A61C 7/002 433/24 |
| 2015/0305830 | A1 | 10/2015 | Howard et al. |
| 2019/0321136 | A1* | 10/2019 | Martz ..................... A61C 7/08 |
| 2020/0000551 | A1* | 1/2020 | Li ......................... A61C 9/0053 |
| 2020/0360109 | A1* | 11/2020 | Gao ..................... G06T 7/0012 |
| 2021/0244502 | A1* | 8/2021 | Farkash ................ A61C 9/0046 |
| 2022/0101618 | A1* | 3/2022 | Reynard ................. A61C 7/002 |
| 2023/0033851 | A1* | 2/2023 | Makarenkova ....... A61B 5/1079 |

OTHER PUBLICATIONS

Grünheid T, Loh C, Larson BE. How accurate is Invisalign in nonextraction cases? Are predicted tooth positions achieved?. The Angle Orthodontist. Nov. 1, 2017;87(6):809-15.*

Vasilakos G, Schilling R, Halazonetis D, Gkantidis N. Assessment of different techniques for 3D superimposition of serial digital maxillary dental casts on palatal structures. Scientific reports. Jul. 19, 2017;7(1):5838.*

Galan-Lopez L, Barcia-Gonzalez J, Plasencia E. A systematic review of the accuracy and efficiency of dental movements with Invisalign®. The Korean Journal of Orthodontics. May 2019;49(3):140-9.*

D. L. Page et al., "Perception-based 3D Triangle Mesh Segmentation Using Fast Marching Watersheds," Proc. Intl. Conf. on Computer Vision and Pattern Recognition, II:27-32, (Jun. 2003).

European Search Report and Search Opinion received for EP Application No. 18306867.5, mailed on Jun. 17, 2019, 7 pages.

H. Akhoondali et al., "Rapid Automatic Segmentation and Visualization of Teeth in CT-Scan Data," Journal of Applied Sciences, 9(11):2031-2044, (2009).

International Preliminary Report on Patentability received for PCT Patent Application No. PCT/EP2019/087087, mailed on Jul. 8, 2021, 8 pages.

International Search Report and Written Opinion received for PCT Patent Application No. PCT/EP2019/087087, mailed on Mar. 26, 2020, 9 pages.

Joe Min Moon, "Evaluation of Software Developed for Automated Segmentation of Digital Dental Models," Thesis, 58 pages, (Feb. 2012).

Office Action received for European Application No. 18306867.5, mailed on May 10, 2021, 9 pages.

Thomas Kronfeld et al., "Snake-Based Segmentation of Teeth from Virtual Dental Casts," Computer-Aided Design & Applications, 7(a):1-12, (2010).

* cited by examiner

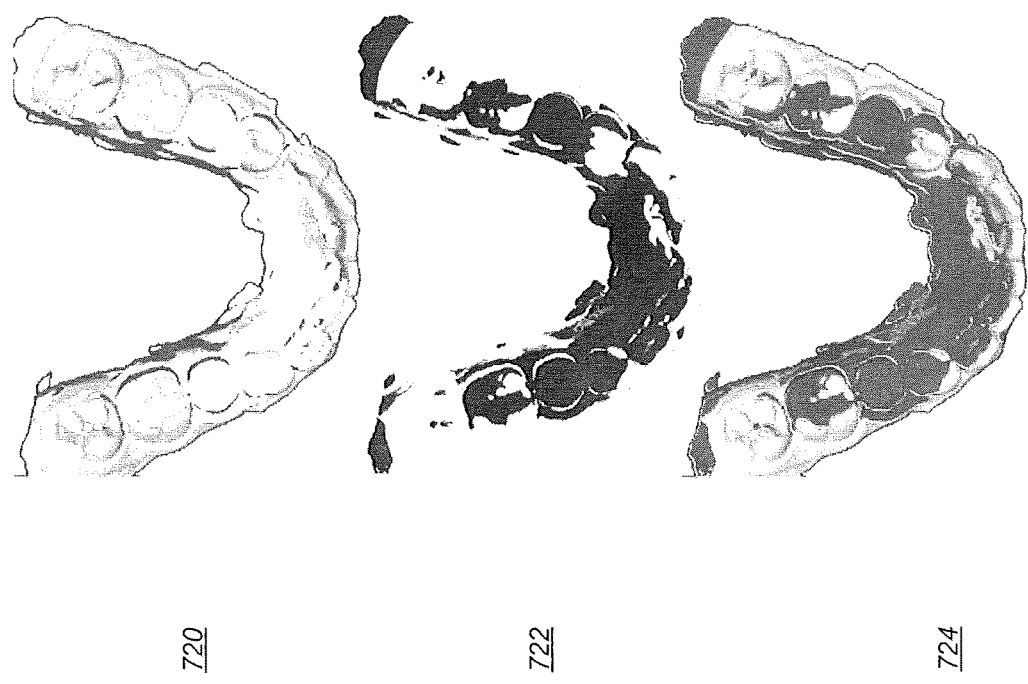

DENTAL MODEL SUPERIMPOSITION USING CLINICAL INDICATIONS

TECHNICAL FIELD

The disclosure relates generally to dental imaging and more particularly relates to methods and apparatus for visual comparison of models for assessment of orthodontic treatment.

BACKGROUND

Optical intraoral scans produce contours of dentition objects and have been helpful in improving visualization of teeth, gums, and other intra-oral structures. Surface contour information can be particularly useful for assessment of tooth condition and has recognized value for supporting various types of dental procedures, such as for restorative dentistry. This can provide a valuable tool to assist the dental practitioner in identifying various problems and in validating other measurements and observations related to the patient's teeth and supporting structures. Surface contour information can also be used to generate 3D models of dentition components such as individual teeth; the position and orientation information related to individual teeth can then be used in assessing orthodontic treatment progress.

For orthodontic and other restorative procedures, an initial model of patient dentition is generated, showing the patient's condition at the beginning of a treatment sequence. Then, periodically, one or more subsequent models may be useful at various stages of the treatment sequence, helping the practitioner to track patient progress over time and to help ascertain what is needed for further tooth adjustment at stages of the treatment process. The generated models can be stored and presented as displayed images, allowing the practitioner to view key structures and obtain measurements between features as well as angular measurements.

Because patient dentition consists of a highly complex arrangement of 3D shapes and surface features, it is often difficult to match and compare two models generated at different times. Comparison of the generated 3D models is not computationally straightforward, nor are there established methods for standardized presentation and measurement of models that have been acquired at different times. Manual manipulation of the 3D images on-screen provides some relevant information for model-to-model comparison; however, manual methods for positioning and viewing dimensional and angular changes between models prove to be time-consuming and inaccurate, often requiring significant skill on the part of the viewing practitioner in order to make sense of the compared data.

Thus, it can be appreciated that improved methods for visual comparison of 3D models would be of value to the orthodontic and restorative dentistry practitioner, simplifying the task of visualizing and tracking treatment progress and assisting the practitioner to provide more efficient and effective treatment to patients.

SUMMARY

An object of the present disclosure is to address the need for improved visualization of treatment progress when using 3D models in restorative and orthodontic dentistry. Embodiments of the present disclosure help to automate and simplify comparison of models generated at different stages of patient treatment.

These objects are given only by way of illustrative example, and such objects may be exemplary of one or more embodiments of the invention. Other desirable objectives and advantages inherently achieved by the disclosed methods may occur or become apparent to those skilled in the art. The invention is defined by the appended claims.

According to one aspect of the disclosure, there is provided a method for displaying a superimposition of a second dental model on a first dental model of a patient's dentition, the method executed at least in part on a computer and comprising:

a) obtaining a first 3D model of the patient's dentition and obtaining a segmentation of the first 3D model;

b) obtaining a second 3D model of the patient's dentition and obtaining a segmentation of the second 3D model;

c) identifying at least one of the segmented teeth of the first and second 3D models as a selected tooth;

d) determining a post-treatment target position for the selected tooth of the first 3D model according to a movement indication calculated for the selected tooth;

e) registering the second 3D model to the first 3D model based on the target position of the at least one selected tooth;

and f) displaying an imposition of the second 3D model onto the first 3D model of the patient dentition.

BRIEF DESCRIPTION OF THE DRAWINGS

The foregoing and other objects, features, and advantages of the invention will be apparent from the following more particular description of the embodiments of the invention, as illustrated in the accompanying drawings.

The elements of the drawings are not necessarily to scale relative to each other.

FIGS. 7A, 7B, and 7C show examples of the model registration process for superposition with controlled displacement of molars for different cases.

DETAILED DESCRIPTION OF THE EMBODIMENTS

Figure 1:
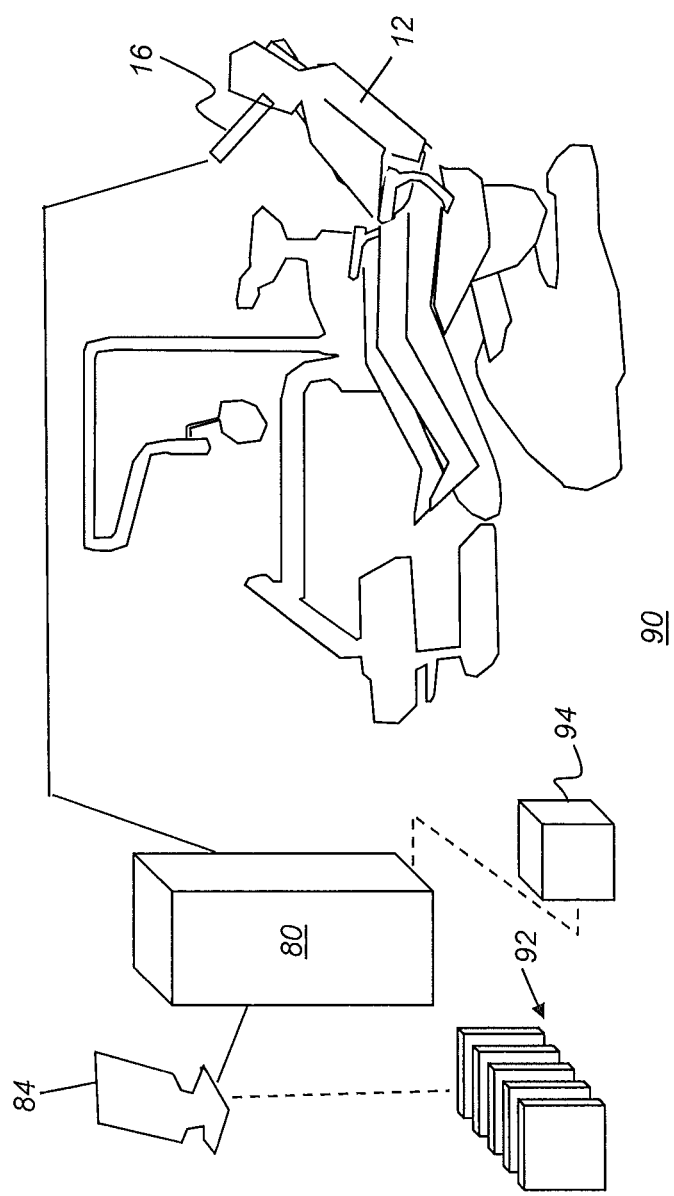
FIG. 1 is a schematic diagram that shows a surface contour imaging apparatus for obtaining a 3D view from a succession of reflectance images according to an embodiment of the present disclosure.

The following is a detailed description of the preferred embodiments, reference being made to the drawings in which the same reference numerals identify the same elements of structure in each of the several figures.

Where they are used in the context of the present disclosure, the terms "first", "second", and so on, do not necessarily denote any ordinal, sequential, or priority relation, but are simply used to more clearly distinguish one step, element, or set of elements from another, unless specified otherwise.

As used herein, the term "energizable" relates to a device or set of components that perform an indicated function upon receiving power and, optionally, upon receiving an enabling signal.

In the context of the present disclosure, the terms "viewer", "operator", and "user" are considered to be equivalent and refer to the viewing practitioner, technician, or other person who views and manipulates an image, such as a dental image, on a display monitor. An "operator instruction" or "viewer instruction" is obtained from explicit commands entered by the viewer, such as by clicking a button on a camera or by using a computer mouse or by touch screen or keyboard entry.

In the context of the present disclosure, the phrase "in signal communication" indicates that two or more devices and/or components are capable of communicating with each other via signals that travel over some type of signal path. Signal communication may be wired or wireless. The signals may be communication, power, data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the present disclosure, the term "detector" refers to the element that is placed in the patient's mouth, receives radiation, and provides the image content. Such a detector is a digital detector that provides the x-ray image data directly to an imaging system.

Mesh representation can be provided using either 3D volume radiographic methods such as CBCT or structured light imaging methods using an intraoral camera or scanner, or by using some combination of radiographic and reflection imaging.

The terms "3D model", "model", "model image", "point cloud", "mesh", and "3D mesh" may be used synonymously in the context of the present disclosure for image structures that visually represent the 3D surface contour of imaged teeth. A dense point cloud is formed using techniques familiar to those skilled in the volume imaging arts for surface contour representation and relates generally to methods that identify points in space corresponding to surface features. A dense point cloud can be generated, for example, using the reconstructed contour data from one or more reflectance images. A mesh can be generated using the same acquired surface contour to identify vertices that serve as the basis for a polygon model for tooth and gum surfaces. The mesh and point cloud representations for a 3D surface can have the same visual appearance depending on magnification; computed coordinates for vertices of the mesh and particular points in the point cloud, however, need not be identical.

CBCT apparatus can be used for acquiring 3D volume content usable for generating a model image of patient dentition. As is well known to those skilled in the imaging arts, the CBCT apparatus rotates an x-ray source and a detector about the subject and acquires a set having a series of radiographic 2D projection images at different angles about the subject. Reconstruction processes are then used to form a reconstructed 3D volume image of the subject or the object using the set of 2D projection images.

Reference is hereby made to commonly assigned U.S. Pat. No. 8,670,521 entitled "Method for Generating an Intraoral Volume Image" to Bothorel et al. for more detailed information on how the CBCT apparatus operates. For forming a model according to an embodiment of the present disclosure, the CBCT apparatus is typically employed to scan a mold or impression of patient dentition.

CBCT imaging apparatus and the imaging algorithms used to obtain 3D volume images using such systems are well known in the diagnostic imaging art and are, therefore, not described in detail in the present application. Some exemplary algorithms and approaches for forming 3D volume images from the 2D projection images that are obtained in operation of the CBCT imaging apparatus can be found, for example, in the teachings of U.S. Pat. No. 5,999,587 entitled "Method of and System for Cone-Beam Tomography Reconstruction" to Ning et al. and of U.S. Pat. No. 5,270,926 entitled "Method and Apparatus for Reconstructing a Three-Dimensional Computerized Tomography (CT) Image of an Object from Incomplete Cone Beam Data" to Tam.

In typical applications, a computer or other type of dedicated logic processor can act as control logic processor for obtaining, processing, and storing image data as part of the CBCT system, along with one or more displays for viewing image results. As noted previously, the acquired 3D volume from the CBCT system can be used for generating a model of patient dentition, which may be in the form of a mesh or point cloud, as described subsequently in more detail.

System for Model Acquisition

The schematic diagram of FIG. 1 shows a surface contour imaging apparatus 90 that can be used for obtaining 3D content for model generation from a succession of reflectance images according to an embodiment of the present disclosure. A scanner or camera 16, typically a hand-held digital camera, a color depth camera, handheld 3D scanner, or intra-oral 3D scanner, is scanned through the mouth of patient 12 for acquiring a set having multiple reflectance images and associated depth information. A control logic processor 80, configurable to execute programmed instructions, is in signal communication with camera 16 and a display 84. Processor 80 obtains image data from camera 16 and processes this image data along with depth information in order to generate individual 3D views 92. Control logic processor 80 then combines the scanned 3D views in order to generate, store, and optionally render, on display 84, a composite 3D model surface 94.

Figure 2:
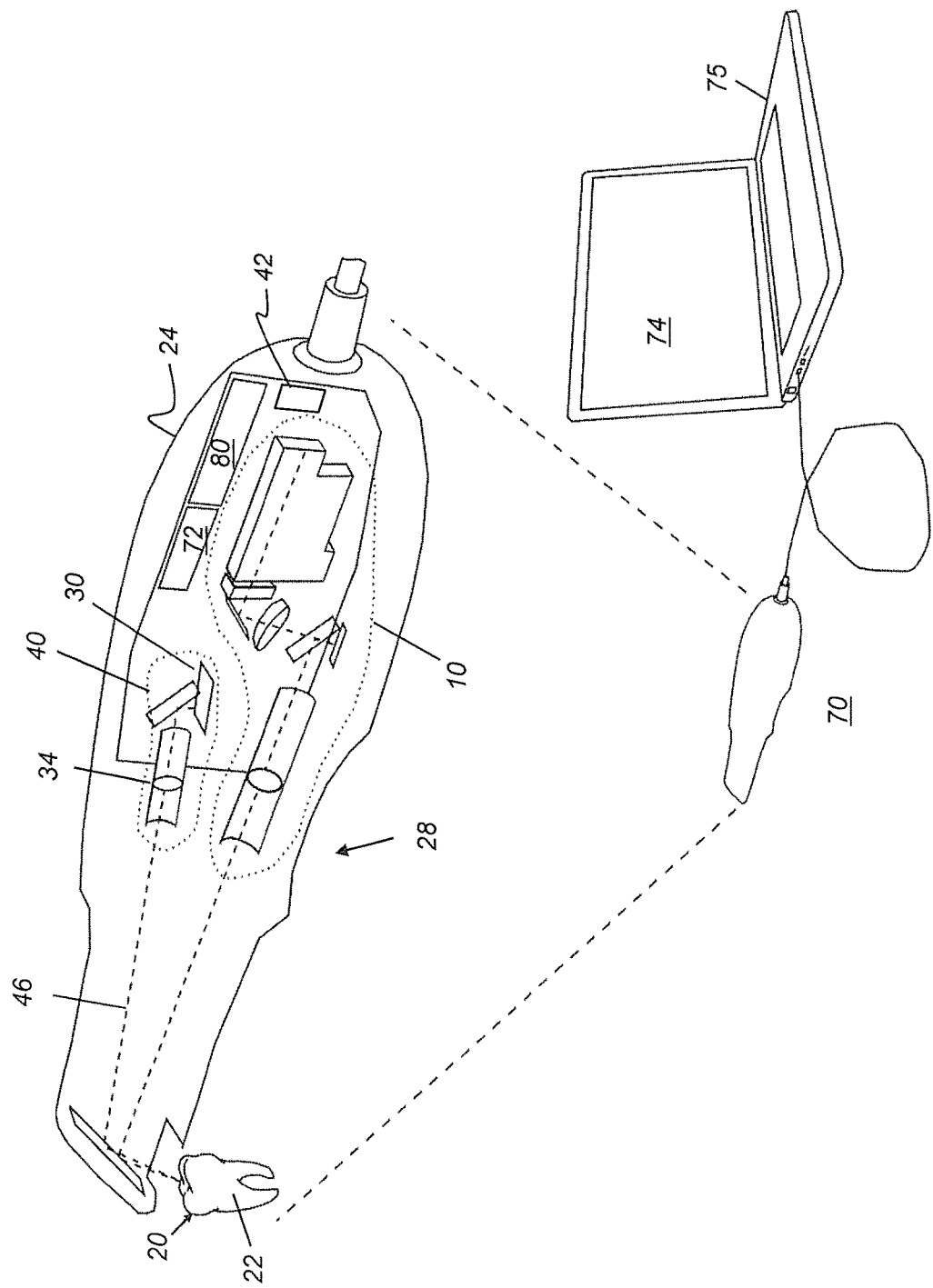
FIG. 2 is a schematic diagram showing an imaging apparatus that can operate as a video camera for polychromatic reflectance image data capture as well as a scanner for executing related projecting and imaging functions.

According to an embodiment of the present disclosure, the processor can be configured to executed programmed instructions for a sequence, defined in more detail subsequently, of:

(i) obtaining a first 3D model of the patient dentition and obtaining a segmentation of the first 3D model;

(ii) obtaining a second 3D model of the patient dentition and obtaining a segmentation of the second;

(iii) identification of at least one of the segmented teeth of the first and second 3D models as a selected tooth;

(iv) determination of a post-treatment target position for the at least one selected tooth of the first 3D model according to a movement indication calculated for the selected tooth, wherein the movement indication specifies a translation or rotation of the selected tooth;

(v) registration of the second 3D model to the first 3D model according to the determined post-treatment target position of the selected tooth;

FIG. 2 is a schematic diagram showing an imaging apparatus 70 that can operate as a video camera 24 for polychromatic reflectance image data capture as well as a scanner 28 for executing related projecting and imaging functions used to characterize surface contour with structured light patterns 46. A handheld imaging apparatus 70 uses a video camera 24 for image acquisition for both contour scanning and image capture functions according to an embodiment of the present disclosure. Control logic processor 80, or other type of computer that may be part of camera 24, controls the operation of an illumination array 10 that generates the structured light and directs the light toward a surface position and controls operation of an imaging sensor array 30. Image data from surface 20, such as from a tooth 22, is obtained from imaging sensor array 30 and stored as video image data in a memory 72. Imaging sensor array 30 is part of a sensing apparatus 40 that includes an objective lens 34 and associated elements for acquiring video image content. Control logic processor 80, in signal communication with camera 24 components that acquire the image, processes the received image data and stores the mapping in memory 72. The resulting image from memory 72 is then optionally rendered and displayed on a display 74, which may be part of another computer 75 used for some portion of the processing described herein. Memory 72 may also include a display buffer. One or more sensors 42, such as a motion sensor, can also be provided as part of scanner 28 circuitry.

In structured light imaging, a pattern of lines or other shapes is projected from illumination array 10 toward the surface of an object from a given angle. The projected pattern from the illuminated surface position is then viewed from another angle as a contour image, taking advantage of triangulation in order to analyze surface information based on the appearance of contour lines. Phase shifting, in which the projected pattern is incrementally shifted spatially for obtaining additional measurements at the new locations, is typically applied as part of structured light imaging, used in order to complete the contour mapping of the surface and to increase overall resolution in the contour image. By way of example and not limitation, use of structured light patterns for surface contour characterization is described in commonly assigned U.S. Patent Application Publications No. US2013/0120532 and No. US2013/0120533, both entitled "3D INTRAORAL MEASUREMENTS USING OPTICAL MULTILINE METHOD" and incorporated herein in their entirety.

Figure 3:
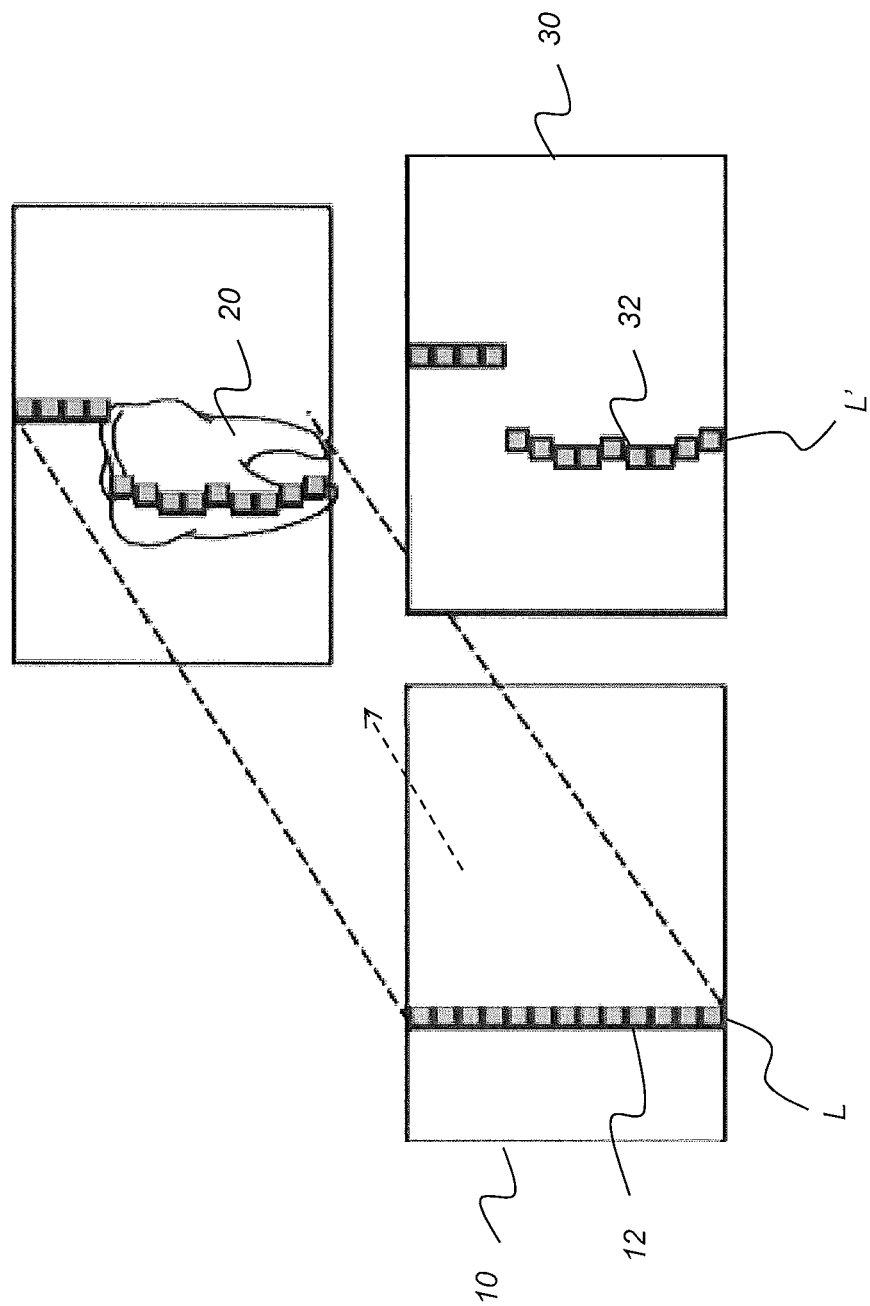
FIG. 3 is a schematic diagram that shows how patterned light is used for obtaining surface contour information by a scanner using a handheld camera or other portable imaging device.

The schematic diagram of FIG. 3 shows, with the example of a single line of light L, how patterned light is used for obtaining surface contour information by a scanner using a handheld camera or other portable imaging device. A mapping is obtained as an illumination array 10 directs a pattern of light onto a surface 20 and a corresponding image of a line L' is formed on an imaging sensor array 30. Each pixel 32 on imaging sensor array 30 maps to a corresponding pixel 12 on illumination array 10 according to modulation by surface 20. Shifts in pixel position, as represented in FIG. 3, yield useful information about the contour of surface 20. It can be appreciated that the basic pattern shown in FIG. 3 can be implemented in a number of ways, using a variety of illumination sources and sequences for light pattern generation and using one or more different types of sensor arrays 30. Illumination array 10 can utilize any of a number of types of arrays used for light modulation, such as a liquid crystal array or digital micromirror array, such as that provided using the Digital Light Processor or DLP device from Texas Instruments, Dallas, Tex. This type of spatial light modulator is used in the illumination path to change the light pattern as needed for the mapping sequence.

By projecting and capturing images that show structured light patterns that duplicate the arrangement shown in FIG. 3 multiple times, the image of the contour line on the camera simultaneously locates a number of surface points of the imaged object. This speeds the process of gathering many sample points, while the plane of light (and usually also the receiving camera) is laterally moved in order to "paint" some or all of the exterior surface of the object with the plane of light.

A synchronous succession of multiple structured light patterns can be projected and analyzed together for a number of reasons, including to increase the density of lines for additional reconstructed points and to detect and/or correct incompatible line sequences. Use of multiple structured light patterns is described in commonly assigned U.S. Patent Application Publications No. US2013/0120532 and No. US2013/0120533, both entitled "3D INTRAORAL MEASUREMENTS USING OPTICAL MULTILINE METHOD" and incorporated herein in their entirety.

Figure 4:
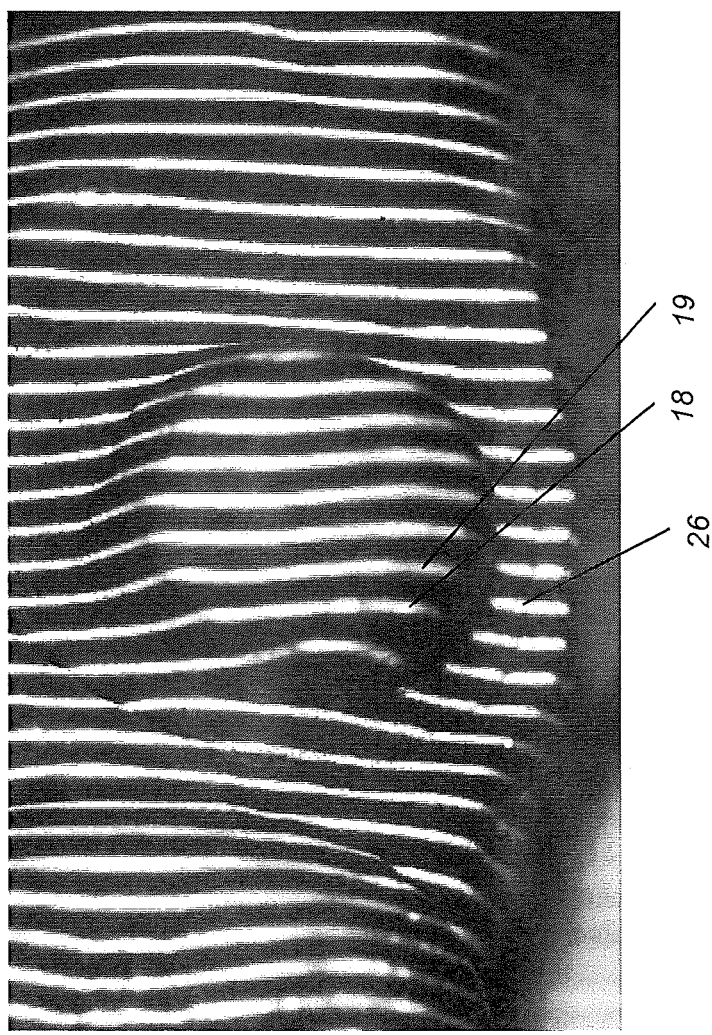
FIG. 4 shows surface imaging using a structured light pattern with multiple lines of light.

FIG. 4 shows surface imaging using a pattern with multiple lines of light. Incremental shifting of the line pattern and other techniques help to compensate for inaccuracies and confusion that can result from abrupt transitions along the surface, whereby it can be difficult to positively identify the segments that correspond to each projected line. In FIG. 4, for example, it can be difficult over portions of the surface to determine whether line segment 26 is from the same line of illumination as line segment 18 or adjacent line segment 19.

3D Surface Model Generation as Mesh or Point Cloud

By knowing the instantaneous position of the camera and the instantaneous position of the line of light within a object-relative coordinate system when the image was acquired, a computer and software can use triangulation methods to compute the coordinates of numerous illuminated surface points relative to a plane. As the plane is moved to intersect eventually with some or all of the surface of the object, the coordinates of an increasing number of points are accumulated. As a result of this image acquisition, a point cloud of vertex points or vertices can be identified and used to represent the extent of a surface within a volume. The points in the point cloud then represent actual, measured points on the three-dimensional surface of an object. A mesh can then be constructed, connecting points on the point cloud as vertices that define individual congruent polygonal faces (typically triangular faces) that characterize the surface shape. The full 3D surface contour image model can then be formed by combining the surface contour information provided by the mesh with polychromatic image content obtained from a camera, such as camera 24 that is housed with camera 24 in the embodiment described with reference to FIG. 2. Polychromatic image content can be provided in a number of ways, including the use of a single monochrome imaging sensor with a succession of images obtained using illumination of different primary colors, one color at a time, for example. Alternately, a color imaging sensor could be used.

Figure 5A:
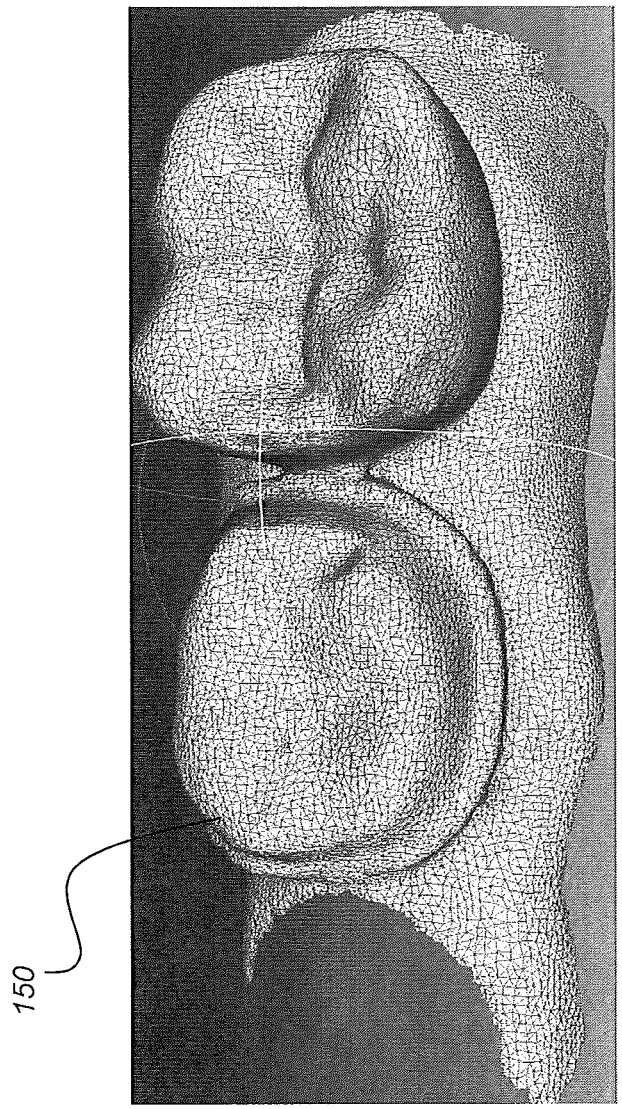
FIGS. 5A and 5B shows point cloud images generated from a succession of structured light images.
Figure 5B:
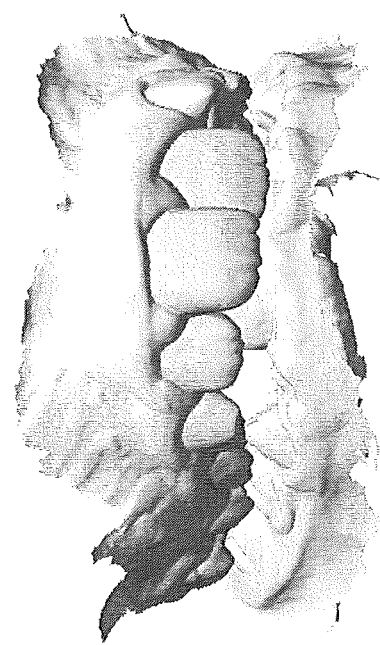

Image processing at control logic processor 80 then generates, from the individual line scan data, a contour surface model. FIGS. 5A and 5B show a point cloud or mesh 150 generated from a succession of structured light images. Further processing of the point cloud content can be used to generate a mesh as an alternative contour surface model.

It should be noted that other types of reflectance imaging can be used for obtaining intraoral surface contour data. Surface contour information can alternately be obtained using time-of-flight imaging or range imaging methods, such as structure-from-motion processing, for example.

Segmentation Methods

Various approaches for addressing the segmentation problem for mesh images have been proposed, such as the following:
(i) A method described in the article "Snake-Based Segmentation of Teeth from Virtual Dental Casts" by Thomas Kronfeld et al. (in Computer-Aided Design & applications, 7(a), 2010) employs an active contour segmentation method that attempts to separate every tooth and gum surface in a single processing iteration. The approach that is described, however, is not a topology-independent method and can fail, particularly where there are missing teeth in the jaw mesh.
(ii) An article entitled "Perception-based 3D Triangle Mesh Segmentation Using Fast Marching Watershed" by Page, D. L. et al. (in *Proc. CVPI* vol II 2003) describes using a Fast Marching Watershed method for mesh segmentation. The Fast Marching Watershed method that is described requires the user to manually enter seed points. The seed points must be placed at both sides of the contours of the regions under segmentation. The method then attempts to segment all regions in one step, using seed information. For jaw mesh segmentation, this type of method segments each tooth as well as the gum at the same time. This makes the method less desirable, because segmenting teeth from the gum region typically requires parameters and processing that differ from those needed for the task of segmenting teeth from each other. Using different segmentation strategies for different types of dentition components with alternate segmentation requirements would provide better performance.
(iii) For support of his thesis, "Evaluation of software developed for automated segmentation of digital dental models", M. J. Moon used a software tool that decomposed the segmentation process into two steps: separation of teeth from gingival structure and segmentation of whole arch structure into individual tooth objects. The software tool used in Moon's thesis finds maximum curvature in the mesh and requires the user to manually choose a curvature threshold to obtain margin vertices that are used for segmenting the tooth. The software also requires the user to manually edit margins in order to remove erroneous segmentation results. Directed to analysis of shape and positional characteristics, this software tool does not consider employing color information in the separation of teeth regions from the gum regions.
(iv) U.S. Patent application 20030039389 A1 entitled "Manipulation a digital dentition model to form models of individual dentition components" by Jones, T. N. et al. disclose a method of separating portions of the dentition model representing the adjacent teeth.

Other reference for tooth segmentation is hereby made to the following:
Akhoondali et al. in "Rapid Automatic Segmentation and Visualization of Teeth in CT-Scan Data", *Journal of Applied Sciences*, pp 2031-2044, (2009); and
Gao et al. in "Tooth Region Separation for Dental CT Images", *Proceedings of the* 2008 *Third International Conference on Convergence and Hybrid Information Technology*, pp 897-901, (2008)

Model Comparison by Superimposition

Embodiments of the present disclosure address the need for comparing two models by providing a visualization that shows the two models in superimposed form. Superimposed display allows the practitioner to quickly and accurately assess and measure progress in adjusting the position of one or more teeth following a treatment period. In order to provide this function, embodiments of the present disclosure use clinical indications to determine which teeth are affected and apply registration techniques that allow visibility of tooth position shift from a suitable reference position.

Figure 6:
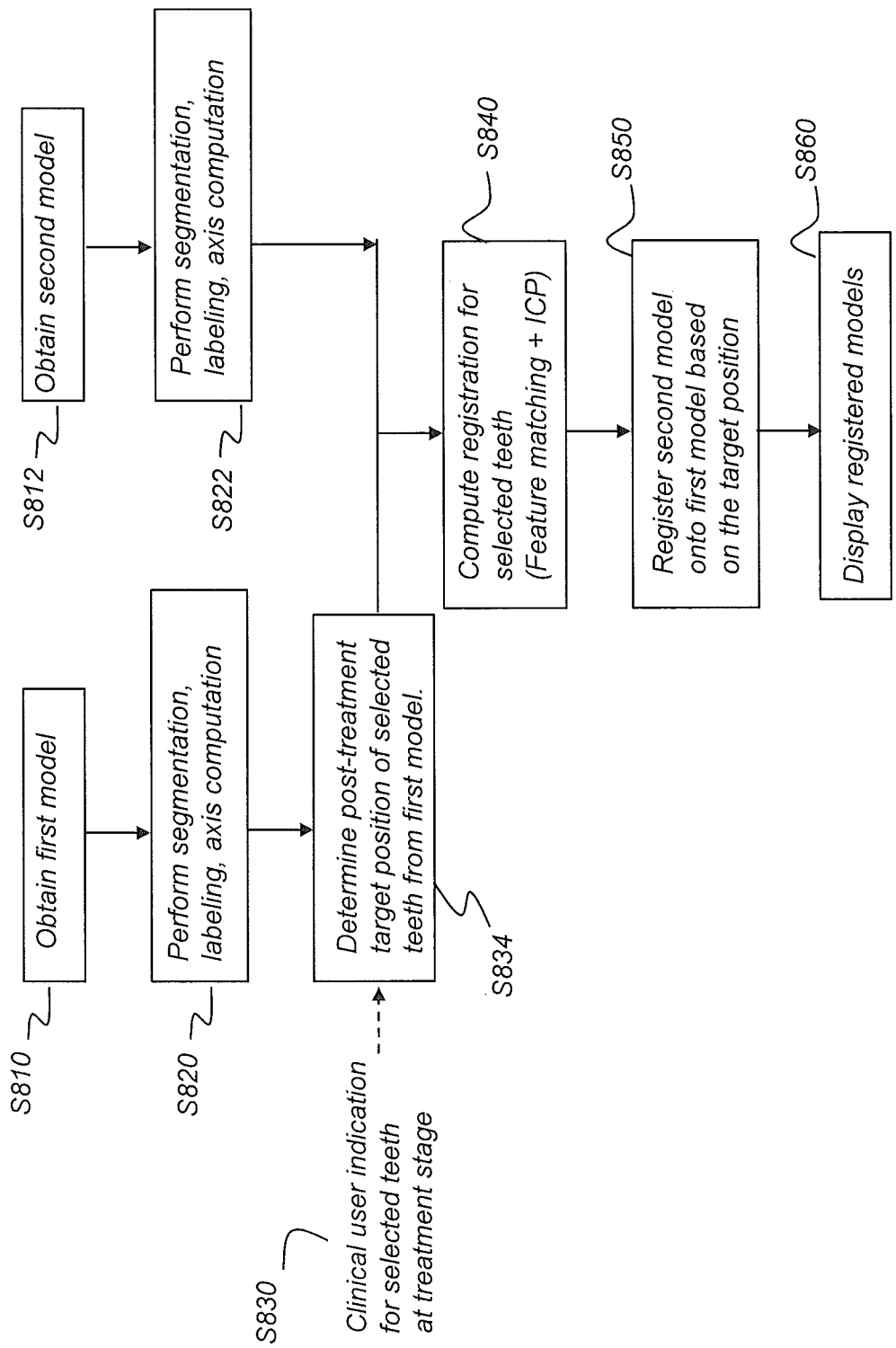
FIG. 6 is a logic flow diagram that shows a global workflow for model superposition using clinical indications for a patient.

The logic flow diagram of FIG. 6 shows a global workflow for model superposition using clinical indications for a patient. A first model and second model are generated and obtained in model acquisition steps S810, S812, respectively, using apparatus and utilities described previously and known to those skilled in the model generation arts. The second model may be acquired following an orthodontic treatment. Each model is then similarly segmented and labeled in respective segmentation steps S820, S822. Steps S820 and S822 obtain segmentation, labeling, and axis orientation for teeth in the respective model.

Continuing with the FIG. 6 sequence, clinical user indications that relate to the patient are provided in an obtain clinical indications step S830. Step S830 identifies, from the clinical indications, "selected" teeth as one or more teeth undergoing treatment that provides incremental movement from initial positions on the first model to target positions on the second model. A position determination step S834 obtains the post-treatment target position of each identified selected tooth from the first model and calculates a movement indication that identifies the incremental adjustment in position for the selected tooth, with relation to both translation movement and angle, that is planned between first and second models. Direction and magnitude for movement can be specified.

After adjustment calculation has been completed using the calculated movement indication as input, a selected tooth registration step S840 computes the registration of the one or more selected teeth. Registration can use a feature matching algorithm or can use iterative closest point (ICP) techniques, for example. A model registration step S850 computes the registration of the second model onto the first model. A display step S860 then renders a view of the registered first and second models, superimposed for practitioner viewing. It can be appreciated that the use of multiple selected teeth is advantageous. Designating a plurality of the segmented teeth as selected teeth provides multiple data points for spatial positioning and thus allows improved accuracy for superimposition of the second 3D model onto the first 3D model and comparison of the two models.

Figure 7A:
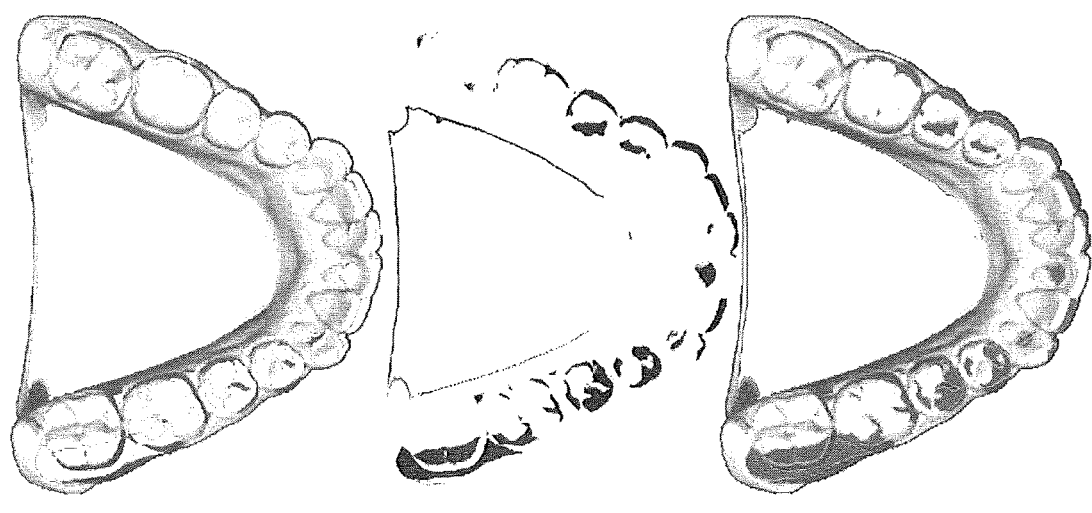

FIGS. 7A, 7B, and C show examples of the model registration process for superposition with controlled displacement of molars for different cases. In FIG. 7A, a first model 710 shows the initial or pre-treatment position of teeth in the mandibular jaw. A second model is obtained following a later stage of treatment. A difference image 712 shows the amount and general direction of displacement effected from the pre-treatment model at this treatment stage. In the example shown in FIG. 7A, the first molars can be seen to have the same position before and after the treatment stage; there is little or no perceptible transverse movement of first molars. A combined model 714 shows the pre-treatment model and post-treatment model superimposed for comparison.

The alternate example of FIG. 7B shows contraction of distance between the first molars effected during the treatment phase. In FIG. 7B, a first model 720 shows the initial or pre-treatment position of teeth in the mandibular jaw. A second model is obtained following a later stage of treatment. A difference image 722 shows the amount and general direction of displacement effected from the pre-treatment model at this treatment stage. A combined model 724 shows the pre-treatment model and post-treatment model superimposed. In the example shown in FIG. 7B, the distance between the two first molars is larger before treatment than after this phase.

Figure 7C:
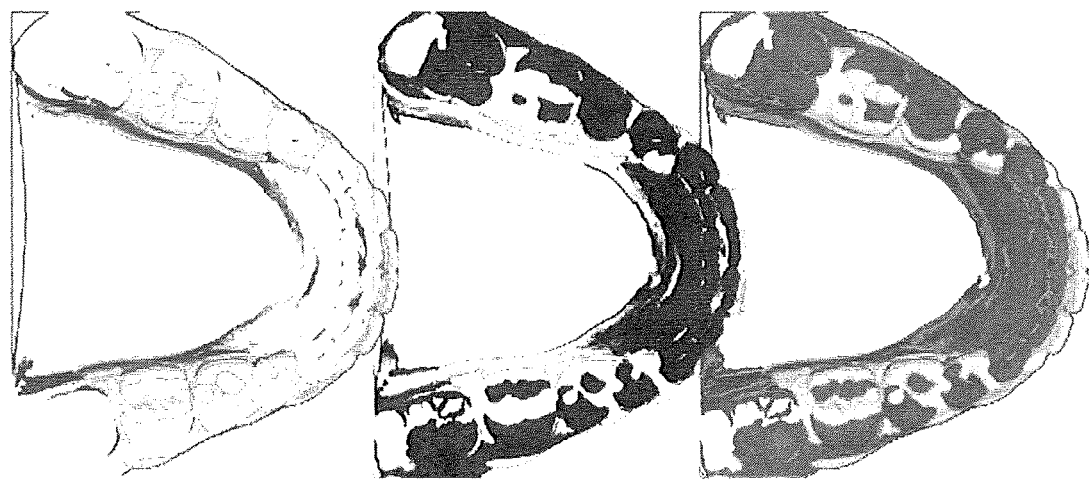

The alternate example of FIG. 7C shows expansion of distance between the first molars effected during the treatment phase. In FIG. 7C, a first model 730 shows the initial or pre-treatment position of teeth in the mandibular jaw. A second model is obtained following a later stage of treatment. A difference image 732 shows the amount and general direction of displacement effected from the pre-treatment model at this treatment stage. A combined model 734 shows the pre-treatment model and post-treatment model superimposed, allowing a tooth-by-tooth comparison, for example. In the example shown in FIG. 7C, the distance between the two first molars is larger after treatment than before.

The difference image, such as shown in the examples of FIGS. 7A-7C can be generated to serve as a guide or reference to overall movement of the patient dentition as a result of an orthodontic treatment sequence. Where it is useful, the difference image can be displayed, stored, or transmitted.

Figure 8:
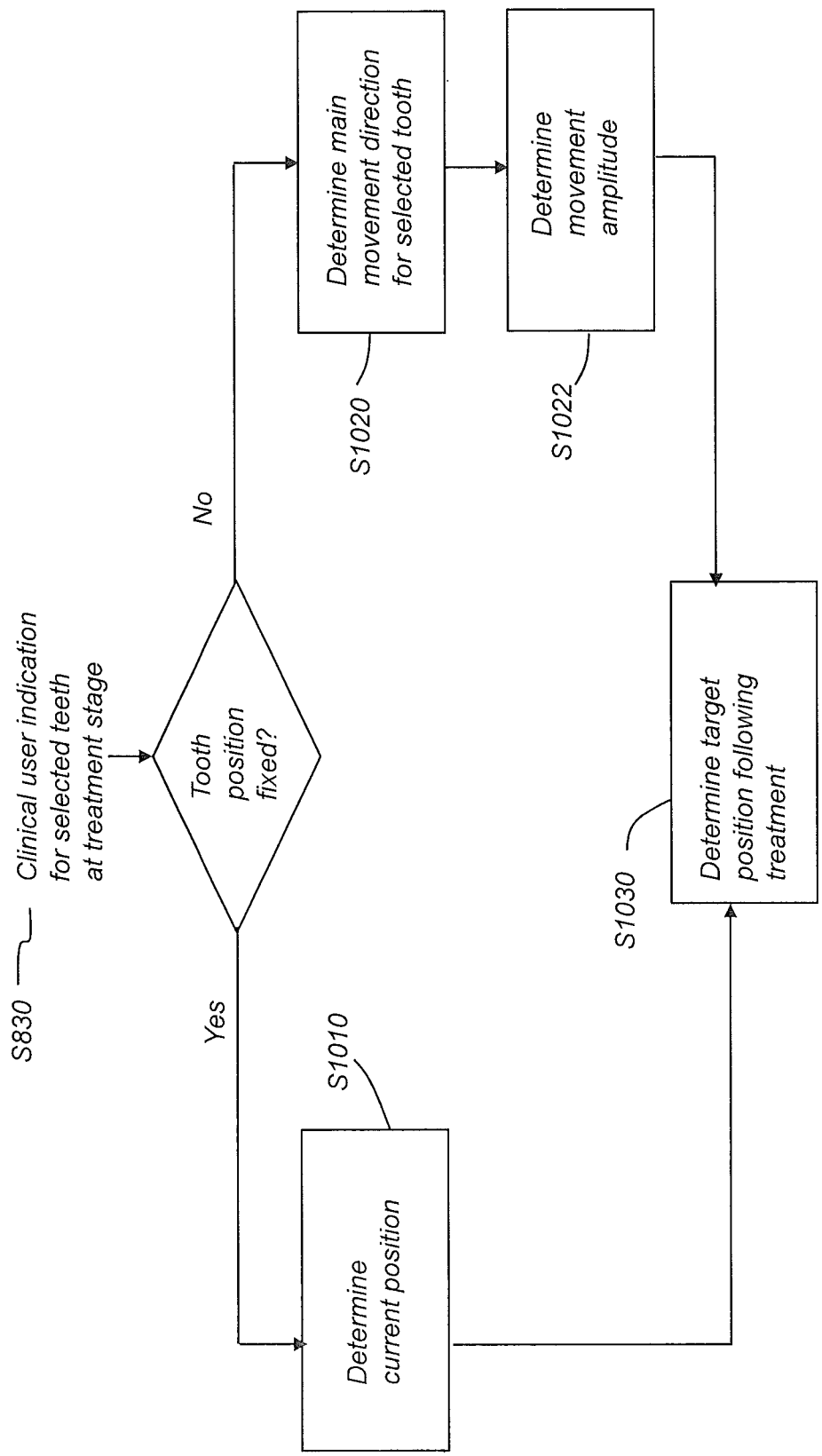
FIG. 8 is a logic flow diagram that shows a detailed workflow sequence for model superposition using a clinical indication.

The logic flow diagram of FIG. 8 shows a detailed workflow sequence for model superposition using a clinical indication. This sequence can be applied, for example, to selected teeth in position determination step S834 of FIG. 6. Based on clinical indications from step S830, it can be determined whether or not the treatment affects tooth position, that is, whether the tooth is fixed or moved as part of the treatment. For a tooth that is fixed, a fixed target determination step S1010 indicates that the targeted position in the first model is the current position of the tooth in the second model. Otherwise, for a tooth that is moved, movement steps S1020 and S1022 determine the direction and magnitude of movement, respectively. A position determination step S1030 then determines the position of each tooth of the first model following treatment, applying direction and amplitude data from steps S1020 and S1022 for teeth that are to be moved. Step S1030 thus defines the target for tooth position, as the tooth appears in the second model.

Figure 9:
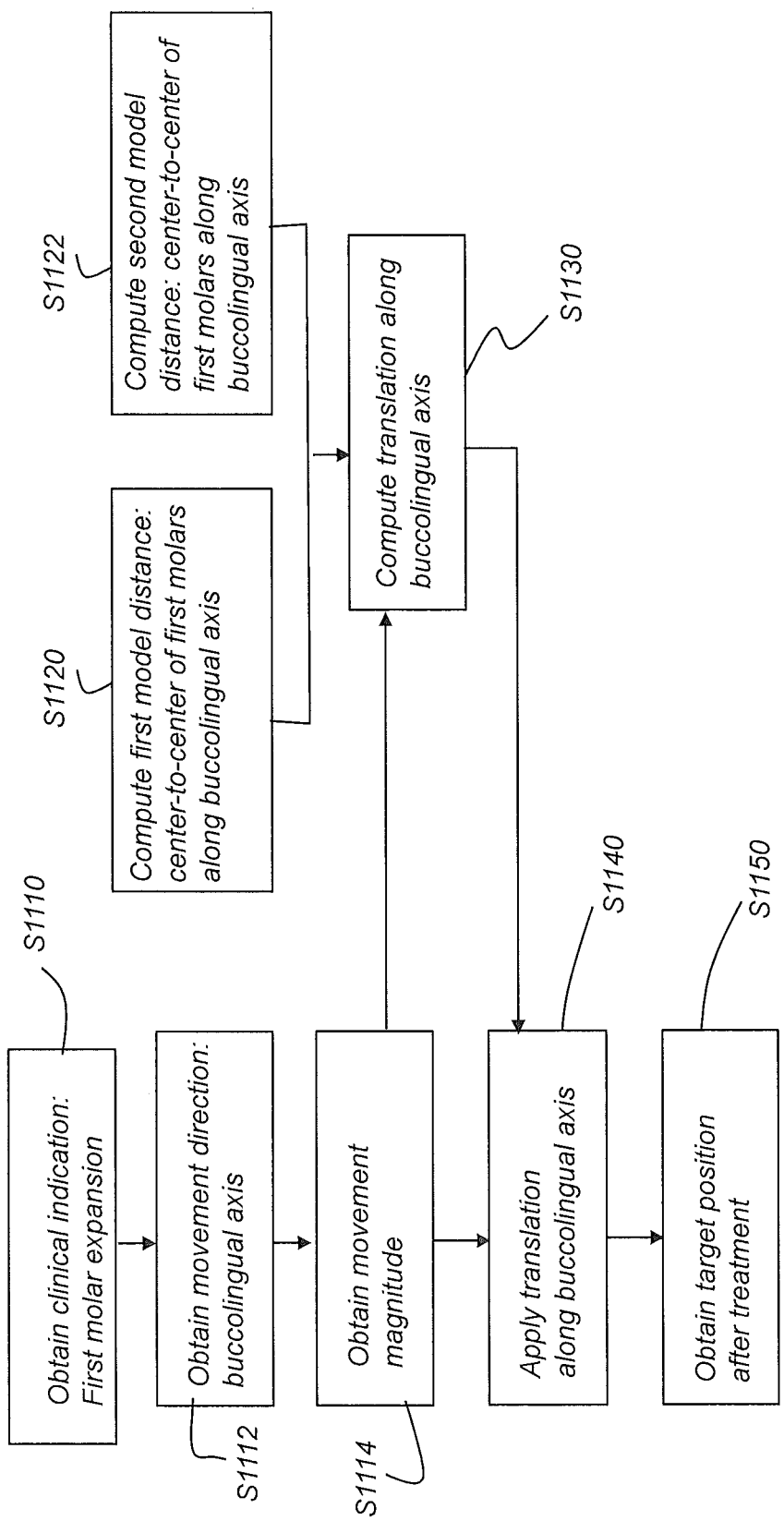
FIG. 9 is a logic flow diagram that shows steps for determining the intended position of a tooth after a treatment interval, using the example of first molar expansion along the buccolingual axis.

The logic sequence of FIG. 9 shows steps for determining the intended position of a tooth after a treatment interval, using the example of first molar expansion along the buccolingual axis. In an obtain clinical indications step S1110, the clinical indications for the patient are acquired. Clinical indications provide information needed for an obtain movement direction step S1112 and obtain movement magnitude step S1114, similar to steps S1020 and S1022 of FIG. 8, respectively. For the particular example of FIG. 9, distance computation steps S1120, S1122 determine the center-to-center distance of first molars along the buccolingual axis for first and second models, respectively. A translation computation step S1130 then computes the needed translation for the first molar along the buccolingual axis. A translation step S1140 applies the computed translation to the model image content with respect to the intended buccolingual axis. An obtain target position step S1150 then computes and reports the target position for the molar following treatment, such as by displaying the target position relative to the model or by providing coordinates or movement vector data.

Figure 10A:
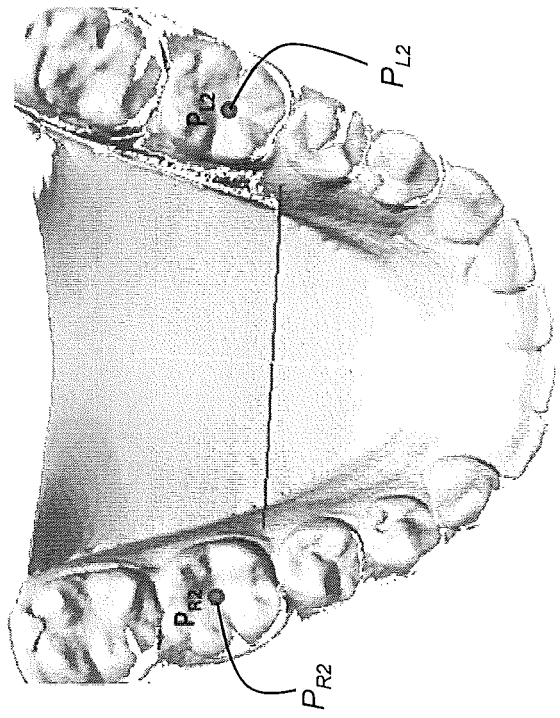
FIG. 10A shows a first model and indicates pairs of center points of molars for contraction.
Figure 10B:
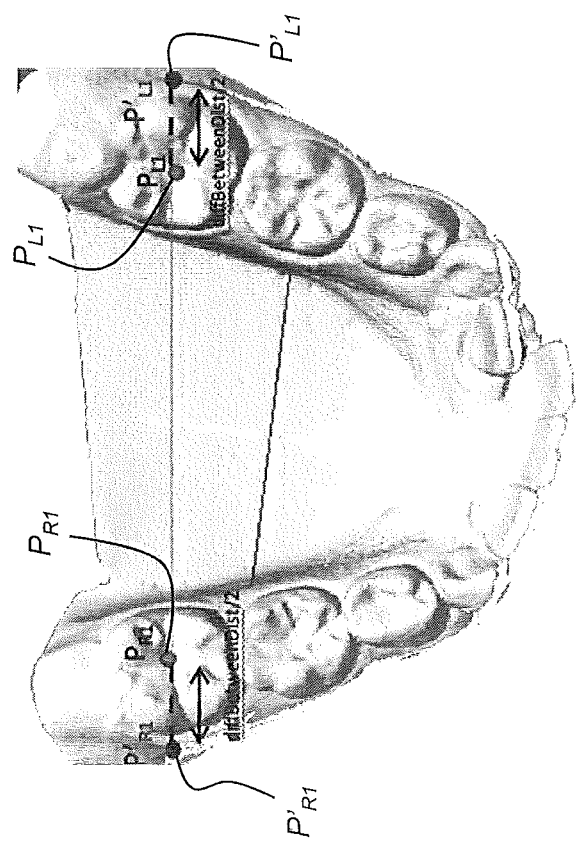
FIG. 10B shows actual center points for the second model.

The data that is processed and computed from FIG. 9 can then be used to effect superposition of models. By way of example, FIG. 10A shows a first model and indicates pairs of center points of molars for the contraction, with a pair of target points $P'_{R1}$ and $P'_{L1}$ and a pair of actual center points $P_{R1}$ and $P_{L1}$ for the first model. FIG. 10B shows actual center points $P_{R2}$ and $P_{L2}$ for the second model. The system display 84 can show either or both models, along with target and actual center points, for example.

The clinical indications for tooth treatment can provide various types of data including information on one or more fixed teeth such as molars, or on implants. Clinical indications can include information on molar expansion or contraction and on sagittal displacement for molars. The clinical indications can also include information on torque to be applied on the incisors. Clinical indications can also specify mesialization or distalization, as practiced in the orthodontic arts.

For first molars expansion, it can be assumed that the molar movement is transversal only, allowing the expansion or contraction computation along an appropriate axis. Expansion or contraction can be measured center-to-center between right and left molars in position for the first model and the intended registered position for the second model. Using this information, it is possible to compute the theoretical positions finally achieved by the molars on the first model. A landmark transform, familiar to those skilled in linear transforms, can be applied between the theoretical position and the position of the molars on the second model.

The display of tooth model imposition can highlight movement of one or more selected teeth between models, such as showing movement differences in color, for example. Calculated movement metrics can also be displayed or otherwise reported.

Consistent with at least one exemplary embodiment, exemplary methods/apparatus can use a computer program with stored instructions that perform on image data that is accessed from an electronic memory. As can be appreciated by those skilled in the image processing arts, a computer program of an exemplary embodiment herein can be utilized by a suitable, general-purpose computer system, such as a personal computer or workstation. However, many other types of computer systems can be used to execute the computer program of described exemplary embodiments, including an arrangement of one or networked processors, for example.

A computer program for performing methods of certain exemplary embodiments described herein may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. Computer programs for performing exemplary methods of described embodiments may also be stored on computer readable storage medium that is connected to the image processor by way of the internet or other network or communication medium. Those skilled in the art will further readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that can be directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that computer program products for exemplary embodiments herein may make use of various image manipulation algorithms and/or processes that are well known. It will be further understood that exemplary computer program product embodiments herein may embody algorithms and/or processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present disclosure, are not specifically shown or described herein and may be selected from such algorithms, systems, hardware, components and elements known in the art.

Exemplary embodiments according to the present disclosure can include various features described herein (individually or in combination).

While the invention has been illustrated with respect to one or more implementations, alterations and/or modifications can be made to the illustrated examples without departing from the spirit and scope of the appended claims. In addition, while a particular feature of the invention can have been disclosed with respect to only one of several implementations/exemplary embodiments, such feature can be combined with one or more other features of the other implementations/exemplary embodiments as can be desired and advantageous for any given or particular function. The term "a" or "at least one of" is used to mean one or more of the listed items can be selected. The term "about" indicates that the value listed can be somewhat altered, as long as the alteration does not result in failure of the process or structure to conform to the described exemplary embodiment.

The invention has been described in detail with particular reference to a presently preferred embodiment, but it will be understood that variations and modifications can be effected within the spirit and scope of the invention.

The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for displaying a superimposition of a second dental model on a first dental model of a patient's dentition, the method executed at least in part on a computer and comprising:
    a) obtaining a first 3D model of the patient's dentition and obtaining a segmentation of the first 3D model to define segmented teeth;
    b) obtaining a second 3D model of the patient's dentition and obtaining a segmentation of the second 3D model to identify the segmented teeth;
    c) identifying at least one segmented tooth of the segmented teeth of the first and second 3D models as at least one selected tooth, wherein the at least one selected tooth is less than all teeth of the patient's dentition;
    d) calculating a first model distance center-to-center of first molars along a buccolingual axis;
    e) calculating a second model distance center-to-center of first molars along the buccolingual axis;
    f) calculating a translation along the buccolingual axis as a movement indication;
    g) determining a post-treatment target position for the at least one selected tooth of the first 3D model based at least in part on the movement indication for the at least one selected tooth;
    h) registering the at least one selected tooth of the second 3D model to the at least one selected tooth of the first 3D model based on the post-treatment target position of the at least one selected tooth;
    and
    i) displaying an imposition of the second 3D model onto the first 3D model of the patient's dentition using registration of the at least one selected tooth.

2. The method of claim 1 wherein obtaining the first or second 3D model comprises obtaining a plurality of images from one of an intraoral scanner and a cone beam computed tomography system scan.

3. The method of claim 1 wherein registering the second 3D model to the first 3D model comprises registering the at least one selected tooth of the second 3D model onto the post-treatment target position of the corresponding at least one selected tooth of the first 3D model.

4. The method of claim 1 wherein the movement indication comprises at least one of a translation or a rotation of the at least one selected tooth of the first 3D model.

5. The method of claim 4 wherein registering the at least one selected tooth onto the post-treatment target position comprises using one of feature matching, iterative closest points algorithm.

6. The method of claim 1 wherein the movement indication comprises at least one of a direction or a magnitude for movement of the at least one selected tooth.

7. The method of claim 1 wherein the post-treatment target position is unchanged from an initial position of the at least one selected tooth.

8. The method of claim 1 wherein the movement indication includes at least one of expansion, contraction, mesialization, and distalization.

9. The method of claim 1 wherein the segmented of the first and second 3D models include a tooth shape, a cervical limit, a label, and an axis for one or more teeth.

10. The method of claim 1 further comprising displaying a movement difference between at least one segmented tooth of the second 3D model and a corresponding segmented tooth of the first 3D model.

11. The method of claim 1 wherein the first 3D model is a mesh or point cloud.

12. The method of claim 1 further comprising generating and displaying a difference image that shows movement of the patient's dentition between the first and second 3D models.

13. The method of claim 1, wherein calculating the translation along the buccolingual axis as the movement indication comprises:
determining a main movement direction; and
determining a movement amplitude.

14. An apparatus for displaying progress of an orthodontic treatment, the apparatus comprising:
a) a device that is configured to obtain a first 3D model of a patient's dentition and a second 3D model of the patient's dentition;
b) a processor that is configured to execute programmed instructions for:
(i) obtaining the first and second 3D models;
(ii) segmentation of teeth in the obtained 3D models;
(iii) identification of at least one selected tooth in the first and second 3D models wherein the at least one selected tooth is less than all of teeth of the patient's dentition;
(iv) calculation of a first model distance center-to-center of first molars along buccolingual axis;
(v) calculation of a second model distance center-to-center of first molars along the buccolingual axis;
(vi) calculation of a translation along the buccolingual axis as a movement indication;
(vii) determination of a post-treatment target position for the selected tooth of the first 3D model according to a-based at least in part on the movement indication calculated for the selected tooth, wherein the movement indication specifies a translation or rotation of the selected tooth;
(viii) registration of the at least one selected tooth of the second 3D model to the at least one selected tooth of the first 3D model according to the determined post-treatment target position of the selected tooth; and
c) a display in signal communication with the processor for displaying an imposition of the second 3D model onto the first 3D model of the patient's dentition based on the registration of the at least one selected tooth.

15. The apparatus of claim 14, wherein obtaining the first or second 3D model comprises obtaining a plurality of images from one of an intraoral scanner and a cone beam computed tomography system scan.

16. The method of claim 15, wherein determining the post-treatment target position for the at least one selected tooth of the first 3D model further comprises:
applying the translation to the first 3D model along the buccolingual axis.

17. The apparatus of claim 14, wherein registration of the at least one selected tooth of the second 3D model to the at least one selected tooth of the first 3D model comprises registration of the at least one selected tooth of the second 3D model onto the post-treatment target position of the corresponding at least one selected tooth of the first 3D model.

18. The apparatus of claim 14, wherein the processor is further configured to execute programmed instructions for displaying a movement difference between at least one segmented tooth of the second 3D model and a corresponding segmented tooth of the first 3D model.

19. The apparatus of claim 14, wherein the first 3D model is a mesh or point cloud.

* * * * *

UNITED STATES PATENT AND TRADEMARK OFFICE
CERTIFICATE OF CORRECTION

Page 1 of 1

PATENT NO. : 12,056,836 B2
APPLICATION NO. : 17/418641
DATED : August 6, 2024
INVENTOR(S) : Delphine Reynard et al.

It is certified that error appears in the above-identified patent and that said Letters Patent is hereby corrected as shown below:

On the Title Page

Column 1
Item (72), Inventors, Lines 2, 3 and 4-5, delete "Marne la Vallee (FR);" and insert -- Marne-la-Vallée (FR); --, therefor.

In the Claims

Column 13
Line 1, Claim 9, delete "segmented" and insert -- segmentation --, therefor;
Line 39, through Column 14, Line 1, Claim 14, delete "according to a-based" and insert -- based --, therefor.

Column 14
Line 19, Claim 16, delete "method" and insert -- apparatus --, therefor.

Signed and Sealed this
Eighteenth Day of February, 2025

Coke Morgan Stewart
*Acting Director of the United States Patent and Trademark Office*